(12) United States Patent
Rho et al.

(10) Patent No.: US 10,090,556 B2
(45) Date of Patent: Oct. 2, 2018

(54) FLEXIBLE BATTERY, MANUFACTURING METHOD THEREFOR, AND AUXILIARY BATTERY COMPRISING FLEXIBLE BATTERY

(71) Applicant: AMOGREENTECH CO., LTD., Gyeonggi-do (KR)

(72) Inventors: Seung Yun Rho, Gyeonggi-do (KR); Won Gil Choi, Gyeonggi-do (KR); Hyeon Woo Cho, Chungcheongnam-do (KR); Ju Hee Jang, Gyeonggi-do (KR)

(73) Assignee: AMOGREENTECH CO., LTD., Gyeonggi-do (KR)

( * ) Notice: Subject to any disclaimer, the term of this patent is extended or adjusted under 35 U.S.C. 154(b) by 0 days.

(21) Appl. No.: 15/508,634

(22) PCT Filed: Sep. 3, 2015

(86) PCT No.: PCT/KR2015/009285
§ 371 (c)(1),
(2) Date: Mar. 3, 2017

(87) PCT Pub. No.: WO2016/036157
PCT Pub. Date: Mar. 10, 2016

(65) Prior Publication Data
US 2017/0288258 A1    Oct. 5, 2017

(30) Foreign Application Priority Data

Sep. 4, 2014   (KR) .................. 10-2014-0118001
Sep. 5, 2014   (KR) .................. 10-2014-0119293

(51) Int. Cl.
*H01M 10/0525*   (2010.01)
*H01M 2/02*       (2006.01)
*H01M 10/04*      (2006.01)

(52) U.S. Cl.
CPC ......... *H01M 10/0525* (2013.01); *H01M 2/02* (2013.01); *H01M 10/04* (2013.01)

(58) Field of Classification Search
None
See application file for complete search history.

(56) References Cited

U.S. PATENT DOCUMENTS

| | | | |
|---|---|---|---|
| 2012/0135299 | A1 | 5/2012 | Kwon et al. |
| 2013/0101884 | A1 | 4/2013 | Ueda |
| 2013/0236766 | A1 | 9/2013 | Seo et al. |

FOREIGN PATENT DOCUMENTS

| | | |
|---|---|---|
| CN | 103201873 | 7/2013 |
| CN | 103218483 | 7/2013 |

(Continued)

OTHER PUBLICATIONS

English translation of Cheol et al KR 2012-0040454 obtained from Google Patents.*

(Continued)

*Primary Examiner* — Sarah A. Slifka
(74) *Attorney, Agent, or Firm* — Norton Rose Fulbright US LLP

(57) ABSTRACT

Provided is a flexible battery. A flexible battery according to an exemplary embodiment of the present invention includes: an electrode assembly; and an exterior material in which the electrode assembly is encapsulated together with an electrolyte, in which the electrode assembly and the exterior material are formed such that patterns for contraction and extension in a longitudinal direction have the same directionality when the flexible battery is bent. As such, the patterns for contraction and extension in the longitudinal direction are formed on both of the exterior material and the (Continued)

electrode assembly, thereby preventing or minimizing deterioration in the required physical properties even though the flexible battery is bent.

20 Claims, 9 Drawing Sheets

(56) References Cited

FOREIGN PATENT DOCUMENTS

| | | |
|---|---|---|
| JP | 2000173559 A | 6/2000 |
| JP | 2006172773 A | 6/2006 |
| JP | 2013109953 A | 6/2013 |
| KR | 20120040454 A | 1/2013 |
| KR | 20120046092 A | 3/2013 |
| KR | 20130081445 A | 7/2013 |
| KR | 20120035270 A | 8/2013 |
| WO | WO 2017/007243 | 1/2017 |

OTHER PUBLICATIONS

English translation of Hye et al 2012-0046092 obtained from Google Patents.*
English translation of Man et al KR 2013-0081445 obtained from Google Patents.*
Supplementary European Search Report issued in European Application No. 15837995, dated Mar. 6, 2018.

* cited by examiner

FLEXIBLE BATTERY, MANUFACTURING METHOD THEREFOR, AND AUXILIARY BATTERY COMPRISING FLEXIBLE BATTERY

CROSS-REFERENCE TO RELATED APPLICATIONS

This application is a national phase application under 35 U.S.C. § 371 of International Application No. PCT/KR2015/009285 filed Sep. 3, 2015, which claims priority to Korean Patent Application No. 10-2014-0119293 filed Sep. 5, 2014, and Korean Patent Application No. 10-2014-0118001 filed Sep. 4, 2014. The entire contents of each of the above-referenced applications are specifically incorporated into the present application by reference.

TECHNICAL FIELD

The present invention relates to a flexible battery, a method of manufacturing a flexible battery, and an auxiliary battery including a flexible battery.

BACKGROUND ART

As demands of customers have been changed due to digitalization and high-performance of electronic products, marketplace demands are also changed to the development of power supply devices which are thin and light in weight and have a high capacity with high energy density.

To meet the demand of the consumers, a power supply device having high energy density and a high capacity, such as a lithium-ion rechargeable battery, a lithium-ion polymer battery, a super capacitor (electric double layer capacitor), and a Pseudo capacitor, has been developed.

Recently, the demand for mobile electronic devices such as mobile phones, notebook computers, and digital cameras has been consistently increased, and particularly, flexible mobile electronic devices, to which a wraparound display, a flexible electronic paper (e-paper), a flexible liquid crystal display (flexible-LCD), and a flexible organic light emitting diode (flexible-OLED) are applied, have increasingly attracted the attention. Therefore, a power supply device used for the flexible mobile electronic device needs to have flexibility.

As one of the power supply devices capable of exhibiting flexibility, the development is being conducted on flexible batteries.

A nickel-cadmium battery, a nickel-metal hydride battery, a nickel-hydrogen battery, a lithium-ion battery, and the like, which have flexibility, may be exemplified as the flexible battery. In particular, the lithium-ion battery has high utilization because the lithium-ion battery has energy density per unit weight and may be quickly charged in comparison with other batteries such as a lead storage battery, the nickel-cadmium battery, the nickel-hydrogen battery, and a nickel-zinc battery.

The lithium ion battery uses a liquid electrolyte, and a welded metallic can is mainly used as a container. However, because a shape of a cylindrical lithium ion battery, which uses the metallic can as a container, is fixed, there are problems in that design of the electric product is restricted, and it is difficult to reduce a volume of the electric product.

In particular, because the mobile electronic device has been developed to be thin, small in size, and flexible as described above, there is a problem in that the existing lithium-ion battery using the metallic can or the battery having an angled structure may not be easily applied to the aforementioned mobile electronic device.

Therefore, to solve the aforementioned structural problems, recently, a pouch type battery, in which an electrolyte is put into a pouch including two electrodes and a separator and the pouch is sealed, has been developed.

The pouch type battery has advantages in that the pouch type battery may be manufactured in various shapes and may implement high energy density per mass because the pouch type battery is made of a flexible material.

That is, as illustrated in FIGS. 1(a) and 1(b), the pouch type battery 1 is provided to have a shape in which an electrode assembly 20 is encapsulated in an exterior material 10, and the exterior material 10 has a structure in which an inner resin layer, a metallic layer, and an outer resin layer are stacked. Among the layers, the metallic layer is an essential constituent element of the exterior material for the purpose of damp proofing, and serves to prevent moisture from permeating into an interior of the exterior material from an exterior of the exterior material because the metallic layer has high density such that the moisture and the electrolyte cannot penetrate the metallic layer, and the metallic layer also serves to prevent the electrolyte positioned in the exterior material from leaking to the outside of the exterior material.

However, there are problems in that it is difficult to ensure flexibility at a predetermined level or higher because the metallic layer has insufficient elastic restoring force, and a crack is formed in the flexible battery to which the exterior material is applied.

Further, in some instances, the pouch type battery 1 is implemented in a flexible form, and then applied to a product. However, because the pouch type battery 1 in the related art is implemented in a simple flexible form, the exterior material and the electrode assembly are damaged due to repetitive contraction and extension when the pouch type battery 1 is repeatedly bent while in use, or performance is significantly reduced in comparison with an initial design value, such that there is a limitation in exhibiting a function of a battery.

SUMMARY OF THE INVENTION

The present invention has been made in an effort to solve the aforementioned problems, and an object of the present invention is to provide a flexible battery, a method of manufacturing a flexible battery, and an auxiliary battery including a flexible battery, which are capable of preventing the occurrence of a crack by predetermined patterns, which are formed on an exterior material and an electrode assembly, respectively, even though the flexible battery is bent.

Another object of the present invention is to provide a flexible battery, a method of manufacturing a flexible battery, and an auxiliary battery including a flexible battery, in which patterns, which are formed on an exterior material and an electrode assembly, respectively, are formed to be coincident with each other, thereby preventing or minimizing deterioration in physical properties required for a battery even though the flexible battery is repeatedly bent.

To solve the aforementioned problems, the present invention provides a flexible battery including: an electrode assembly; and an exterior material in which the electrode assembly is encapsulated together with an electrolyte, in which the electrode assembly and the exterior material are formed such that patterns for contraction and extension in a longitudinal direction have the same directionality when the flexible battery is bent.

According to the exemplary embodiment of the present invention, the pattern may include a first pattern formed on at least one surface of the exterior material, and a second pattern formed on the electrode assembly in the same direction as the first pattern, and the first pattern and the second pattern may be disposed to be coincident with each other.

In addition, the pattern may be provided such that a plurality of crest portions and a plurality of trough portions are alternately formed in the longitudinal direction, and the crest portion and the trough portion may have an arc-shaped cross section, a polygonal cross section, or a combination thereof.

In addition, the patterns may be entirely or partially formed in the longitudinal direction on the electrode assembly and the exterior material, and each of the crest portion and the trough portion may be continuously or discontinuously formed in a direction parallel to a width direction of the electrode assembly and the exterior material.

In this case, intervals between neighboring crest portions or intervals between neighboring trough portions may be formed to have an equal interval or an unequal interval, or the equal interval and the unequal interval are combined, and the pattern may be continuously or discontinuously formed in the longitudinal direction.

In addition, the exterior material may include a first region for forming an accommodating portion that accommodates the electrode assembly and the electrolyte, and a second region which is disposed to surround the first region and forms a sealing portion, and the pattern formed on the exterior material may be formed only in the first region.

In addition, the electrode assembly may include a positive electrode and a negative electrode which are configured as a part or the entirety of a current collector is coated with an active material, and a separator which is disposed between the positive electrode and the negative electrode, and the separator may include a porous non-woven fabric layer which has fine pores, and a nanofiber web layer which contains polyacrylonitrile nano fibers on one surface or both surfaces of the non-woven fabric layer. In this case, the active material may include PTFE so as to prevent a crack and prevent separation from the current collector.

In addition, the exterior material may be formed such that a first resin layer, a metallic layer, and a second resin layer are sequentially laminated, and the second resin layer may be exposed to the outside.

In addition, the first resin layer may be configured as a single layer of a material or a laminated layer of two or more materials selected from acid modified polypropylene (PPa), casting polyprolypene (CPP), linear low density polyethylene (LLDPE), low density polyethylene (LDPE), high density polyethylene (HDPE), polyethylene terephthalate, polypropylene, ethylenevinyl acetate (EVA), epoxy resin, and phenol resin.

In this case, an average thickness of the first resin layer may be 20 μm to 80 μm, a thickness of the metallic layer may be 5 μm to 100 μm, and an average thickness of the second resin layer may be 10 μm to 50 μm.

In addition, the metallic layer may include one or more material selected from aluminum, copper, phosphorbronze (PB), aluminum bronze, cupronickel, beryllium-copper, chromium-copper, titanium-copper, iron-copper, corson alloy, and chromium-zirconium copper alloy.

In addition, the second resin layer may include one or more materials selected from nylon, polyethylene terephthalate (PET), cyclo olefin polymer (COP), polyimide (PI), and fluorine-based compound In addition, the fluorine-based compound may include one or more materials selected from polytetra fluoroethylene (PTFE), perfluorinated acid (PFA), fluorinated ethylene propylene copolymer (FEP), polyethylene tetrafluoro ethylene (ETFE), polyvinylidene fluoride (PVDF), ethylene chlorotrifluoroethylene (ECTFE), and polychlorotrifluoroethylene (PCTFE).

In addition, an adhesive layer may be disposed between the metallic layer and the first resin layer, and the adhesive layer may include one or more materials selected from silicone, poly phthalate, acid modified polypropylene (PPa), and acid modified polyethylene (PEa). In this case, an average thickness of the adhesive layer may be 5 μm to 30 μm.

In addition, a dry lamination layer may be disposed between the metallic layer and the second resin layer, and an average thickness of the dry lamination layer may be 1 μm to 7 μm.

In addition, the electrolyte may include a gel polymer electrolyte.

Meanwhile, the present invention may be implemented as an auxiliary battery including: the flexible battery; and a soft housing which covers a surface of the exterior material, in which the housing is provided with at least one terminal unit to be electrically connected with a target device to be charged.

According to the present invention, the patterns for contraction and extension in the longitudinal direction are formed on both of the exterior material and the electrode assembly, and as a result, it is possible to prevent the occurrence of a crack even though the flexible battery is bent, thereby ensuring physical properties required as a battery.

Further, according to the present invention, the patterns, which are formed on the exterior material and the electrode assembly, respectively, are formed to be coincident with each other, and as a result, it is possible to prevent or minimize deterioration in physical properties required as a battery even though the flexible battery is repeatedly bent.

Accordingly, the present invention may be applied to various electronic devices, such as a rollerable display as well as a wearable device such as a smartwatch and a watch strap, which need to have a battery with ensured flexibility.

DETAILED DESCRIPTION OF THE INVENTION

Figure 1:
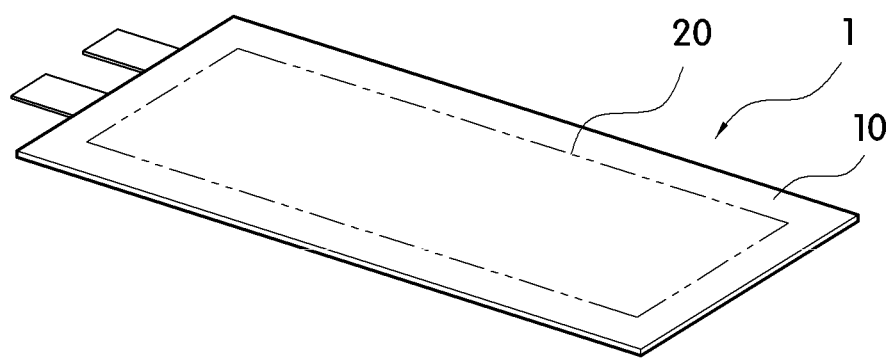
FIG. 1A is an entire schematic view illustrating a battery in the related art.
FIG. 1B is a cross-sectional view of FIG. 1A.
Figure 1:
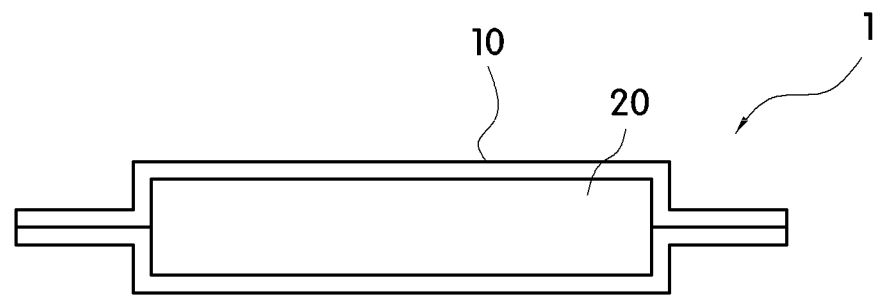

Hereinafter, an exemplary embodiment of the present invention will be described in detail with reference to the accompanying drawings so that those skilled in the technical field to which the present invention pertains may easily carry out the exemplary embodiment. The present invention may be implemented in various different ways, and is not limited to the exemplary embodiments described herein. The drawings and description are to be regarded as illustrative in nature and not restrictive. Like reference numerals designate like elements throughout the specification.

Figure 2:
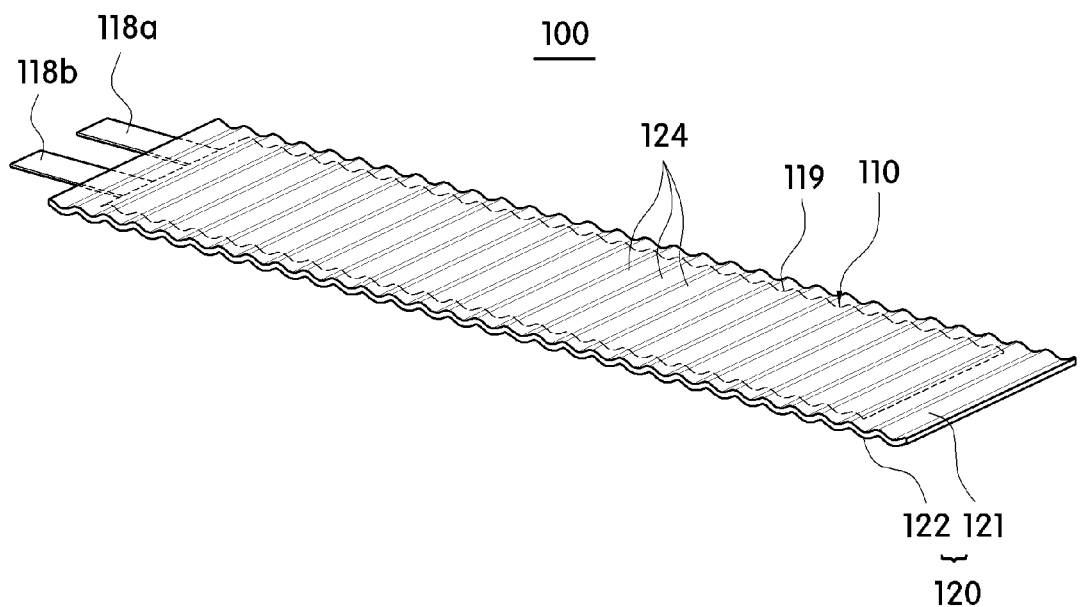
FIG. 2 is an entire schematic view illustrating a flexible battery according to an exemplary embodiment of the present invention.
Figure 3:
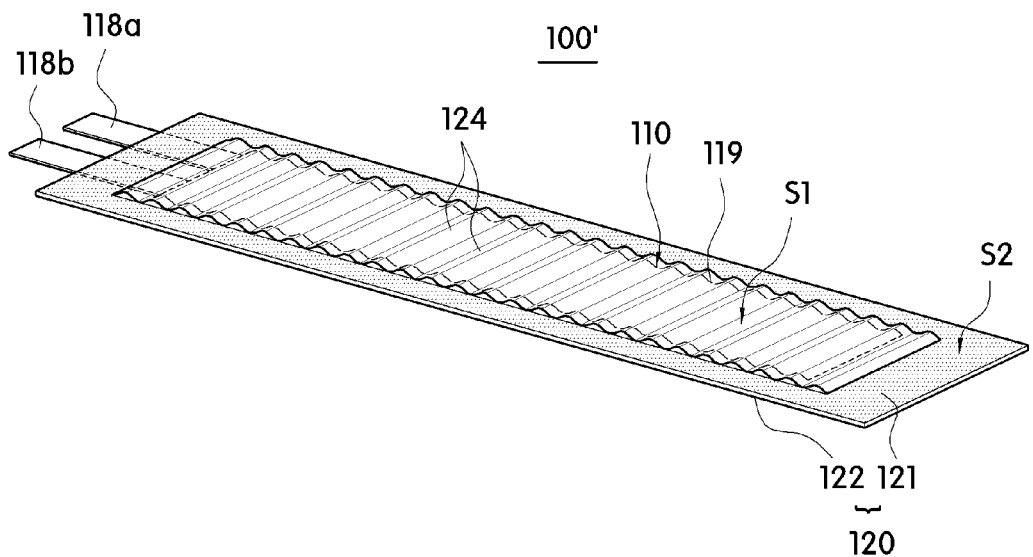
FIG. 3 is an entire schematic view illustrating a flexible battery according to another exemplary embodiment of the present invention, which illustrates a case in which a first pattern is formed only on an accommodating portion of an exterior material.

As illustrated in FIGS. 2 and 3, a flexible battery 100 according to an exemplary embodiment of the present invention includes an electrode assembly 110 and an exterior material 120, and the electrode assembly 110, together with an electrolyte, is encapsulated in the exterior material 120.

In this case, the electrode assembly 110 and the exterior material 120 according to the present invention have patterns 119 and 124 for contraction and extension in a longitudinal direction, respectively, and a first pattern 124 formed on the exterior material 120 and a second pattern 119 formed on the electrode assembly 110 are provided to have the same directionality.

The patterns 119 and 124 prevent or minimize contraction or extension of a substrate itself by cancelling out a change amount of length which is caused by a change in curvatures of the portions which are warped when the flexible battery 100 is bent.

Accordingly, a deformation amount of the substrate itself, which constitutes the electrode assembly 110 and the exterior material 120, is prevented or minimized, such that a deformation amount of the substrate itself, which may occur locally at the warping portion, is minimized even though the flexible battery 100 is repeatedly bent, and as a result, it is possible to prevent the electrode assembly 110 and the exterior material 120 from being locally damaged by bending of the flexible battery 100 or to prevent deterioration in performance.

In this case, the first pattern 124 and the second pattern 119 are disposed such that the first pattern 124 and the second pattern 119 have the same directionality and are coincident with each other. The reason is to allow the first pattern 124 and the second pattern 119 to always behave equally, thereby enabling the first pattern 124 and the second pattern 119 to always maintain initial states thereof even though the flexible battery 100 returns back to the original state after being bent.

Figure 11A:
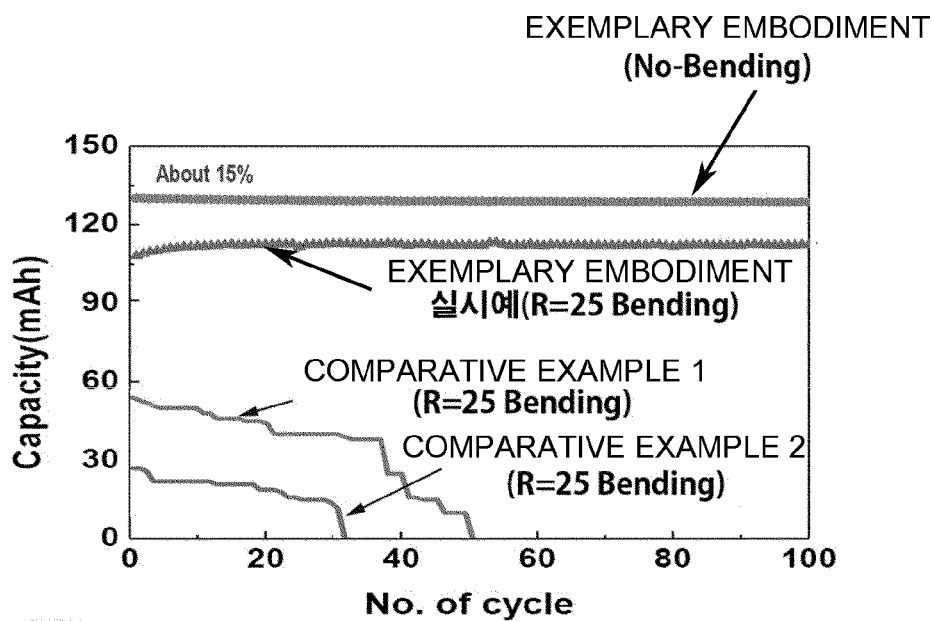
FIG. 11A is a graph illustrating performance of the flexible battery according to the exemplary embodiment of the present invention, that is, a graph illustrating a change in battery capacity before and after the flexible battery is bent.
Figure 11B:
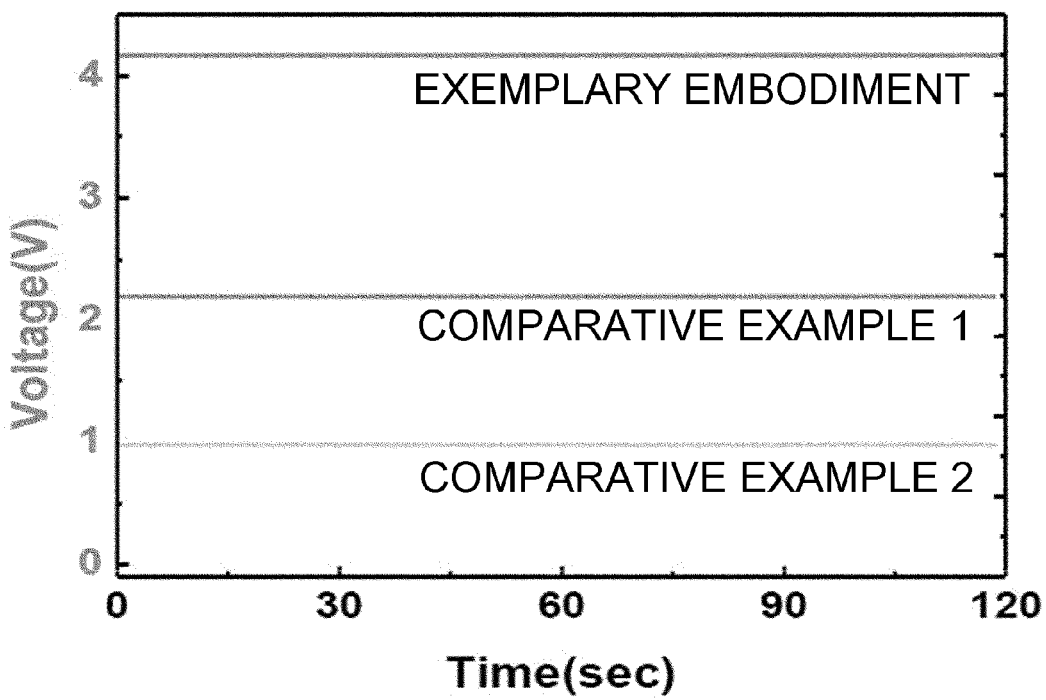
FIG. 11B is a graph illustrating performance of the flexible battery according to the exemplary embodiment of the present invention, that is, a graph illustrating a change in voltage of the battery with respect to time when instantaneous external force is applied to a bent portion.

These performance can be seen from graphs of FIGS. 11A and 11B.

That is, as illustrated in FIG. 11A, it can be seen that under an environment with a temperature of 25° C. and humidity of 65%, when the flexible battery is bent by applying force to both end portions of the flexible battery so that a curvature of a bent portion is 25 mm and the flexible battery is charged and discharged 100 times, the flexible battery 100 or 100' according to the present invention has a capacity (110 mAh), which is reduced by about 15% in comparison with a capacity (130 mAh) when the flexible battery is not bent, and maintains performance even though the charge and the discharge are carried out 100 times (Exemplary Embodiment), but a flexible battery having the patterns for contraction and extension formed only on the exterior material has a capacity (52 mAh) reduced by about 60% in comparison with an initial capacity, has performance being slowly decreased, and cannot be charged and discharged when the number of times the flexible battery is charged and discharged exceeds 50 (Comparative Example 1), and a flexible battery, which is provided in the form of a simple plate without having a pattern formed on the exterior material and the electrode assembly, has a capacity (26 mAh) reduced by about 80% in comparison with an initial capacity, and cannot be charged and discharged when the number of times the flexible battery is charged and discharged exceeds 30 (Comparative Example 2).

Meanwhile, as illustrated in FIG. 11B, it can be seen that as a result of measuring voltage of the battery with respect to time after the flexible battery returns back to the original state from the state in which an intermediate portion in the longitudinal direction of the flexible battery is completely folded, under an environment with a temperature of 25° C. and humidity of 65%, the flexible battery 100 or 100' according to the present invention does not show a change in voltage value (Exemplary Embodiment), but the flexible battery (Comparative Example 1) having the patterns for contraction and extension formed only on the exterior material and the flexible battery (Comparative Example 2), which is provided in the form of a simple plate without having a pattern formed the exterior material and the electrode assembly, show deterioration in voltage value.

In other words, it can be seen that in a case in which the patterns 119 and 124 for contraction and extension are formed on the exterior material 120 and the electrode assembly 110 so as to be coincident with each other, performance does not greatly deteriorate even though the flexible battery is bent, but in a case in which the pattern is formed only on the exterior material or neither the exterior material nor the electrode assembly has the pattern, a crack is formed or the electrolyte leaks due to the bending of the flexible battery, such that performance of the battery deteriorates.

As described above, according to the flexible battery 100 100' according to the present invention, the patterns 119 and 124 for contraction and extension in the longitudinal direction of the electrode assembly 110 and the exterior material 120, are formed to be coincident with each other, and as a result, the electrode assembly 110 and the exterior material 120 may always maintain an uniform interval or a contact state over the overall length even though the flexible battery is bent, and therefore, the electrolyte, which is encapsulated together with the electrode assembly 110, is uniformly distributed over the overall length, thereby preventing deterioration in performance of the battery.

To this end, crest portions and trough portions of each of the first pattern 124 and the second pattern 119 are formed in a direction parallel to a width direction of the exterior material 120 and the electrode assembly 110, and the crest portions and the trough portions are alternately disposed in the longitudinal direction of the exterior material 120 and the electrode assembly 110. In addition, regarding the crest portions and the trough portions which constitute the first pattern 124 and the second pattern 119, the crest portions are formed at the same positions, and the trough portions are formed at the same positions, such that the first pattern 124 and the second pattern 119 are matched with each other.

Specifically, the crest portions and the trough portions of the first pattern 124 and the second pattern 119 are formed in a direction parallel to a straight line parallel to the width direction of the exterior material 120 and the electrode assembly 110, and the crest portions and the trough portions are repeatedly disposed in the longitudinal direction (see FIGS. 2 and 3).

Figure 4:
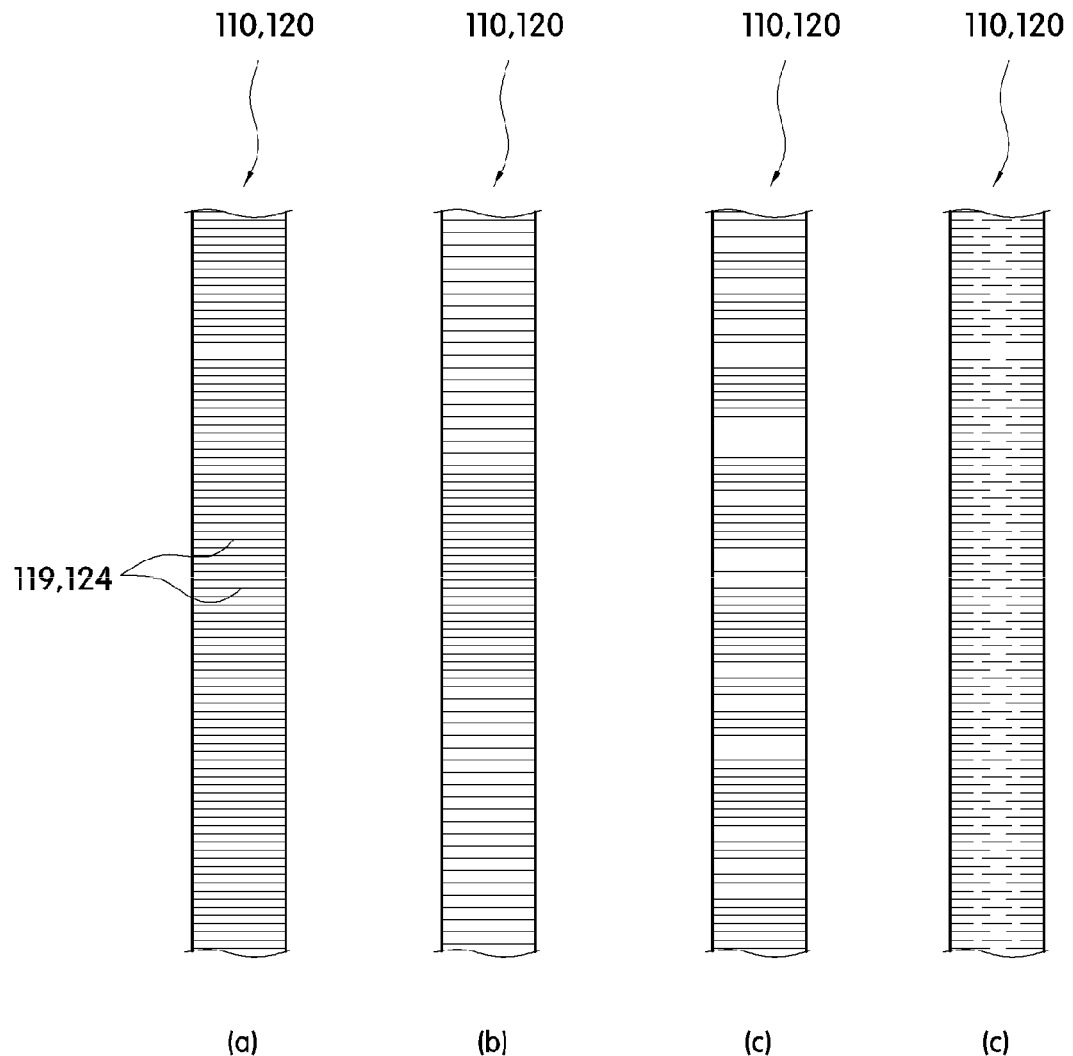
FIG. 4 is an exemplified view illustrating various patterns applied to an electrode assembly and an exterior material of the flexible battery according to the exemplary embodiment of the present invention, which illustrates various intervals between neighboring trough portions or neighboring crest portions.
Figure 5:
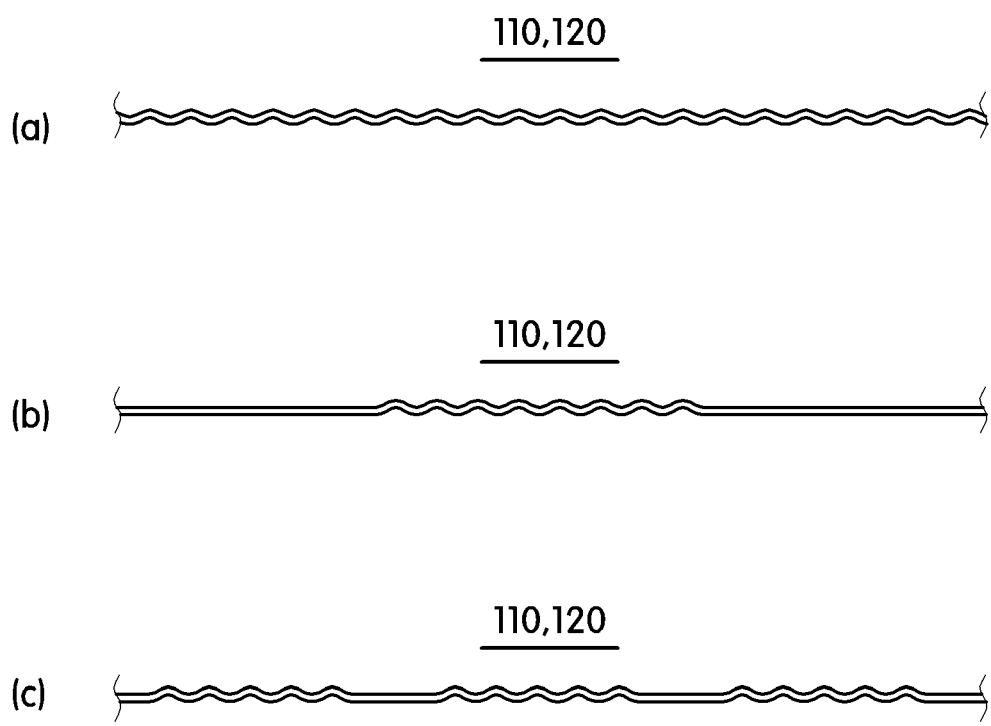
FIG. 5 is an exemplified view illustrating various patterns applied to the electrode assembly and the exterior material of the flexible battery according to the exemplary embodiment of the present invention, that is, an exemplified view illustrating a case in which the pattern is continuously or discontinuously formed over an overall length.
Figure 6:
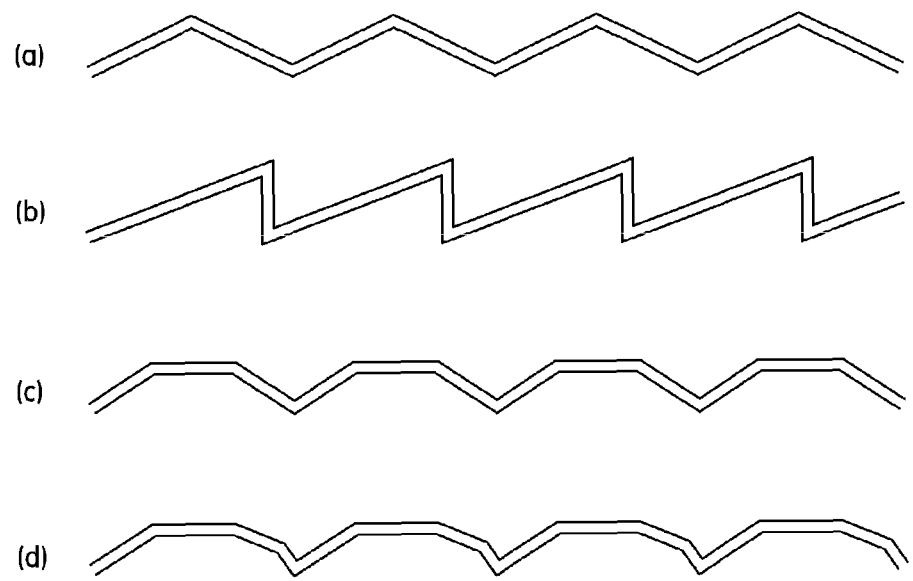
FIGS. 6 to 9 are schematic views illustrating various cross-sectional shapes of the patterns applied to the flexible battery according to the exemplary embodiment of the present invention.
Figure 7:
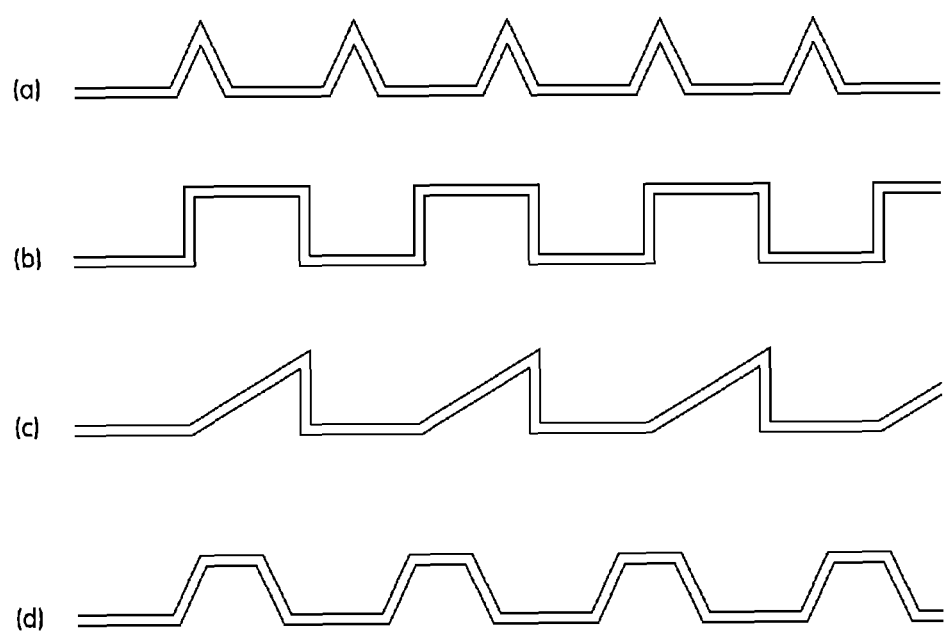
Figure 8:
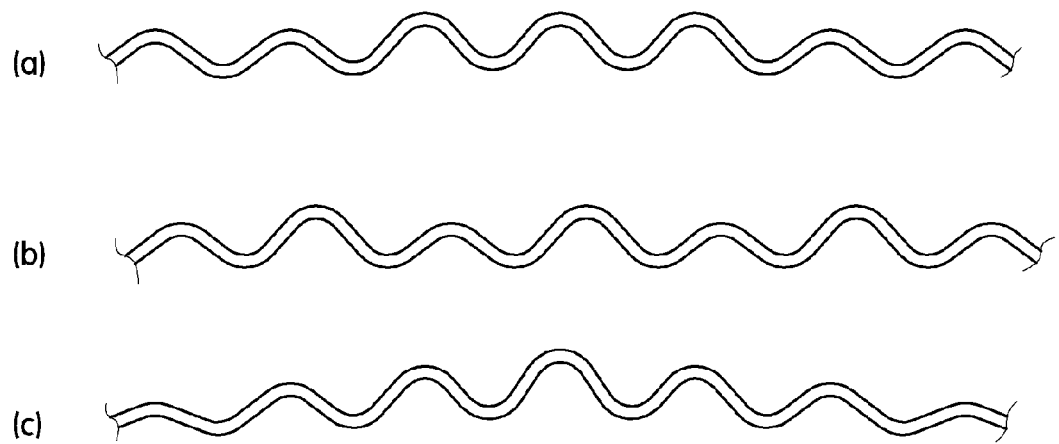
Figure 9:
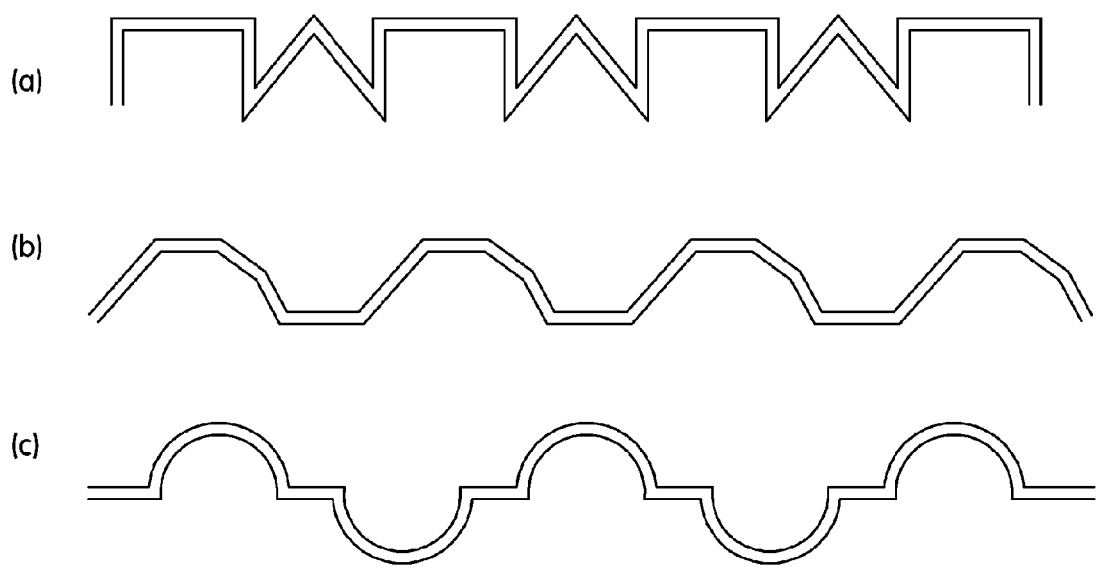

In this case, the patterns 119 and 124 may be continuously or discontinuously formed in the direction parallel to the width direction of the electrode assembly 110 and the exterior material 120 (see FIG. 4), and may be formed over the overall length of the electrode assembly 110 and the exterior material 120 or may be partially formed over a partial length of the electrode assembly 110 and the exterior material 120 (see FIG. 5).

Here, each of the crest portion and the trough portion may be provided to have cross sections having various shapes such as an arc-shaped cross section including a semi-circular cross section, a polygonal cross section including a triangular or quadrangular cross section, and a combination of an arc-shaped cross section and a polygonal cross section, and each of the crest portion and the trough portion may be provided to have the same pitch and the same width, but may be provided to have different pitches and different widths (see FIGS. 6 to 9).

Accordingly, even though the exterior material 120 and the electrode assembly 110 are repeatedly contracted and extended in the longitudinal direction as the flexible battery is repeatedly bent, it is possible to reduce a degree of fatigue of the substrate itself because a change amount of contraction and extension is cancelled out by the patterns 119 and 124.

Meanwhile, as illustrated in FIG. 4, the first pattern 124 and the second pattern 119 may be formed such that the intervals between the neighboring crest portions are equal to or different from each other or the intervals between the neighboring trough portions are equal to or different from each other, or the same interval and different intervals may be combined.

As an example, in a case in which the flexible battery 100 or 100' according to the present invention is applied to a product such as a watch strap, the intervals between the crest portions and the trough portions, which constitute the patterns 119 and 124, may be equal to each other over the overall length, but the intervals between the crest portions and the trough portions formed at one side of a coupling portion, which is relatively frequently bent during a process of fastening or unfastening the watch strap, may be narrow, such that a change amount of contraction and extension of the coupling portion, which is cancelled out by the patterns 119 and 124, may be relatively larger than those of other portions.

Further, the first pattern 124 formed on the exterior material 120 may be formed on the entire surface of the exterior material 120, or may be partially formed on the entire surface of the exterior material 120.

As an example, as illustrated in FIG. 3, in the flexible battery 100' according to the present invention, the first pattern 124 may be formed only in a first region S1 which defines an accommodating portion for accommodating the electrode assembly 110 and the electrolyte.

The reason is that no first pattern 124 is formed in a second region S2 which constitutes a sealing portion for preventing the electrolyte from leaking to the outside, thereby eliminating a likelihood of the electrolyte moving along the first pattern 124, and improving airtightness by increasing joining force between a first exterior material 121 and a second exterior material 122.

It is noted that in a case in which the first pattern 124 is formed only in the first region S1, the first pattern 124 may be formed over an overall area of the first region S1, or may be formed only in a region having an area corresponding to an area of the electrode assembly 110.

Figure 10:
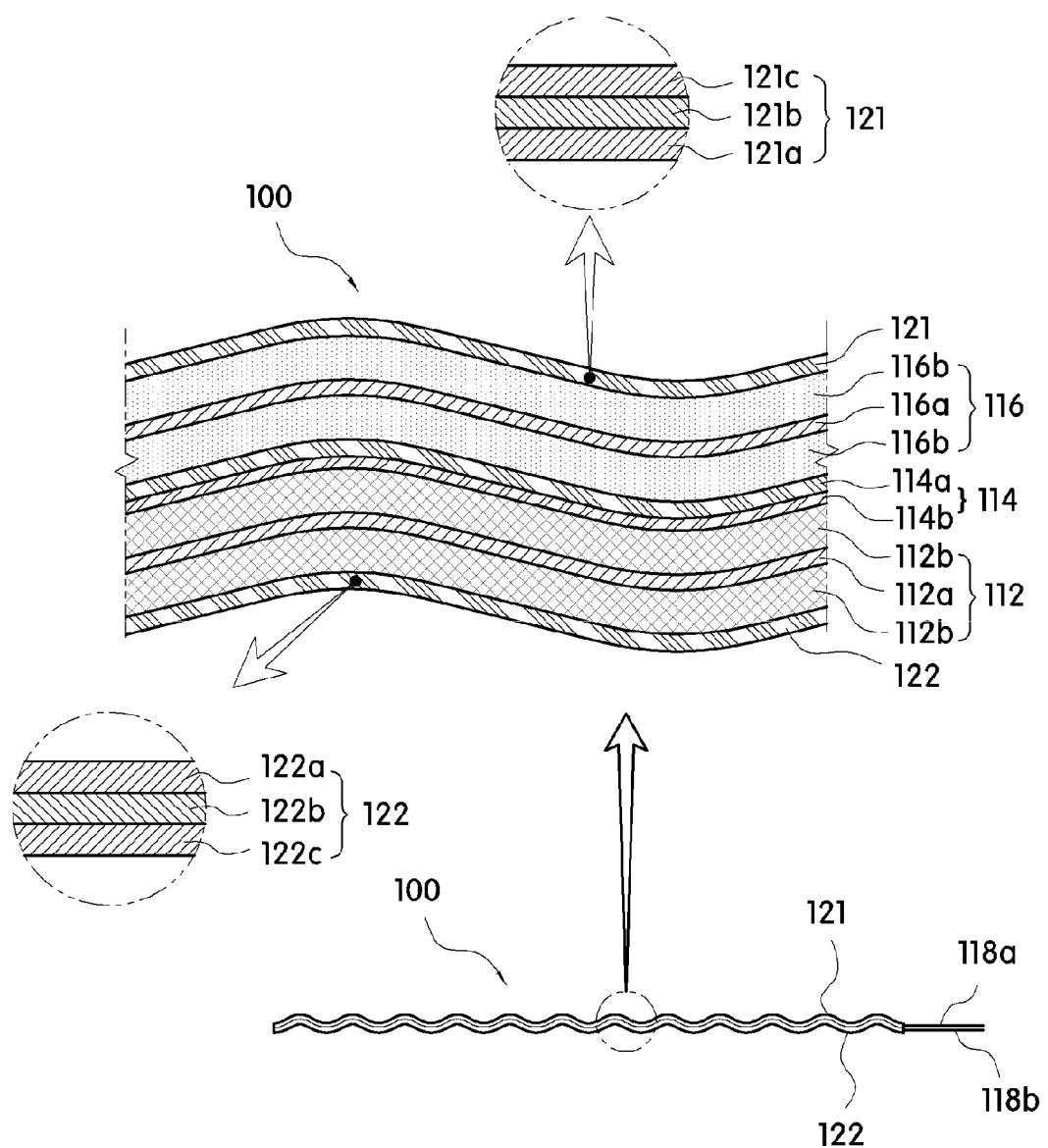
FIG. 10 is an enlarged view illustrating a detailed configuration of the flexible battery according to the exemplary embodiment of the present invention.

Meanwhile, the electrode assembly 110 is encapsulated in the exterior material 120 together with the electrolyte, and includes a positive electrode 112, a negative electrode 116, and a separator 114, as illustrated in FIG. 10.

The positive electrode 112 includes a positive electrode current collector 112a and a positive electrode active material 112b, the negative electrode 116 includes a negative electrode current collector 116a and a negative electrode active material 116b, and the positive electrode current collector 112a and the negative electrode current collector 116a may be implemented in the form of a plate-shaped sheet having a predetermined area.

That is, the active materials 112b and 116b may be compressed, deposited, or applied onto one surface or both surfaces of the current collectors 112a and 116a of the positive electrode 112 and the negative electrode 116, respectively. In this case, the active materials 112b and 116b may be provided over overall areas of the current collectors 112a and 116a, or may be partially provided in a partial area.

Here, the negative electrode current collector 116a and the positive electrode current collector 112a may be formed of a thin metallic foil, and may be made of copper, aluminum, stainless steel, nickel, titanium, chromium, manganese, iron, cobalt, zinc, molybdenum, tungsten, silver, gold, and a mixture thereof.

In addition, the positive electrode current collector 112a and the negative electrode current collector 116a may be formed with a negative electrode terminal 118a and a positive electrode terminal 118b, respectively, so as to be electrically connected to an external device from bodies of the positive electrode current collector 112a and the negative electrode current collector 116a. Here, the positive electrode terminal 118b and the negative electrode terminal 118a may be provided to extend from the positive electrode current collector 112a and the negative electrode current collector 116a, respectively, and protrude from one side of the exterior material 120, or may be provided to be exposed from a surface of the exterior material 120.

Meanwhile, the positive electrode active material 112b includes a positive electrode active material which may reversibly perform intercalation and deintercalation on lithium ions, and as a representative example of the positive electrode active material, one of lithium-transition metal oxide such as $LiCoO_2$, $LiNiO_2$, $LiNiCoO_2$, $LiMnO_2$, $LiMn_2O_4$, $V_2O_5$, $V_6O_{13}$, $LiNi1\text{-}x\text{-}yCoxMyO_2$ ($0 \leq x \leq 1$, $0 \leq y \leq 1$, $0 \leq x+y \leq 1$, M is metal such as Al, Sr, Mg, and La), and an NCM (lithium nickel cobalt manganese) based active material may be used, and a mixture in which one or more of these materials are mixed may be used.

In addition, the negative electrode active material 116b includes a negative electrode active material which may reversibly perform intercalation and deintercalation on lithium ions, and the negative electrode active material may be selected from a group consisting of crystalline or amorphous carbon, carbon fiber, or a carbon-based negative electrode active material of a carbon composite, tin oxide, a lithiated material thereof, lithium, lithium alloy, and a mixture in which one or more of these materials are mixed. Here, carbon may be one or more materials selected from a group consisting of a carbon nanotube, a carbon nanowire, a carbon nanofiber, graphite, active carbon, graphene pin, and graphite.

However, it is noted that the positive electrode active material and the negative electrode active material used in the present invention are not limited to the materials, all of the positive electrode active materials and the negative electrode active materials, which are typically used, may be used.

In this case, in the present invention, the positive electrode active material 112b and the negative electrode active material 116b may contain polytetrafluoroethylene (PTFE). The reason is to prevent the positive electrode active material 112b and the negative electrode active material 116b from being separated from the current collectors 112a and 116a, respectively, or to prevent the occurrence of a crack when the flexible battery is bent.

The component of the PTFE may be 0.5 to 20 wt %, and particularly, may be equal to or less than 5 wt % based on a total weight of each of the positive electrode active material 112b and the negative electrode active material 116b.

Meanwhile, the separator 114, which is disposed between the positive electrode 112 and the negative electrode 116, may include a nanofiber web layer 114b formed on one surface or both surfaces of a non-woven fabric layer 114a.

Here, the nanofiber web layer 114b may be a nanofiber containing one or more materials selected from a polyacrylonitrile nanofiber and a polyvinylidene fluoride nanofiber.

In particular, the nanofiber web layer 114b may be made of only the polyacrylonitrile nanofiber in order to ensure spinnability and uniformly form pores. Here, an average diameter of the polyacrylonitrile nanofiber may be 0.1 to 2 μm, particularly, 0.1 to 1.0 μm.

The reason is that it is impossible to ensure sufficient heat resistance of the separator if an average diameter of the polyacrylonitrile nanofiber is smaller than 0.1 μm, and if the average diameter of the polyacrylonitrile nanofiber is greater than 2 μm, mechanical strength of the separator is excellent, but elastic force of the separator may be decreased.

In addition, in a case in which a gel polymer electrolyte is used as the electrolyte, a composite porous separating membrane may be used as the separator 114 in order to optimize impregnation properties of the gel polymer electrolyte.

That is, the composite porous separating membrane may include a porous non-woven fabric which is used as a matrix and has fine pores, and a porous nanofiber web which is made of a spinnable polymeric material and is impregnated with the electrolyte.

Here, any one of a PP non-woven fabric, a PE non-woven fabric, a non-woven fabric with PP/PE fibers having a double structure of which the outer circumference of the PP fiber, as a core, is coated with PE, a non-woven fabric which has a three-layer structure of PP/PE/PP and has a shut-down function caused by PE having a relatively low melting point, a PET non-woven fabric formed of polyethylene terephthalate (PET) fibers, and a non-woven fabric formed of cellulose fibers may be used as the porous non-woven fabric. Further, a melting point of the PE non-woven fabric may be 100 to 120° C., a melting point of the PP non-woven fabric may be 130 to 150° C., and a melting point of the PET non-woven fabric may be 230 to 250° C.

In this case, a thickness of the porous non-woven fabric may be set to a range of 10 to 40 μm, porosity may be set to 5 to 55%, a Gurley value may be set to 1 to 1000 sec/100 c.

Meanwhile, the porous nanofiber web may be made of a single swelling polymer which is swelled by the electrolyte, or may be made of a mixed polymer formed by mixing the swelling polymer with a heat-resistant polymer which may enhance heat resistance.

When a spinning solution is formed by dissolving the single or mixed polymer in a solvent and the spinning solution is spun by using an electric spinning apparatus, the spun nanofibers are collected by the collector, thereby forming the porous nanofiber web having a three-dimensional pore structure.

Here, the porous nanofiber web may be formed by using any polymer as long as the polymer may form the spinning solution by being dissolved in a solvent, and the nanofiber may be formed by spinning the spinning solution by an electric spinning method. As an example, the polymer may be the single polymer or the mixed polymer, and a swelling polymer, a non-swelling polymer, a heat-resistant polymer, a mixed polymer formed by mixing the swelling polymer and the non-swelling polymer, and a mixed polymer formed by mixing the swelling polymer and the heat-resistant polymer may be used.

In a case in which the porous nanofiber web uses the mixed polymer formed by mixing the swelling polymer and the non-swelling polymer (or the heat-resistant polymer), the swelling polymer and the non-swelling polymer may be mixed with a weight ratio in a range of 9:1 to 1:9, particularly, in a range of 8:2 to 5:5.

Typically, the non-swelling polymer is generally a heat-resistant polymer in many instances, and has a relatively high melting point in comparison with the swelling polymer because the non-swelling polymer has a high molecular weight. Therefore, the non-swelling polymer may be a heat-resistant polymer having a melting point of 180° C. or higher, and the swelling polymer may be a resin having a melting point of 150° C. or lower, particularly, a melting point in a range of 100 to 150° C.

Meanwhile, as the swelling polymer which may be used for the present invention, a resin, which is swelled by the electrolyte and may be used to form ultrafine nanofibers by the electric spinning method, may be used.

As an example, as the swelling polymer, polyvinylidenefluoride (PVDF), poly(vinylidenefluoride-co-hexafluoropropylene), perfluoropolymer, polyvinylchloride or polyvinylidenechloride and a copolymer thereof and a polyethyleneglycol derivative including polyethyleneglycol dialkylether and polyethyleneglycol dialkylester, poly(oxymethylene-oligo-oxyethylene), polyoxide including polyethyleneoxide and polypropyleneoxide, polyvinyl acetate, poly(vinylpyrrolidone-vinylacetate), polystyrene and polystyrene acrylonitrile copolymer, polyacrylonitrile copolymer including polyacrylonitrile methylmethacrylate copolymer, polymethyl methacrylate, polymethyl methacrylate copolymer, and a mixture formed by mixing one or more types of these materials.

In addition, the heat-resistant polymer or the non-swelling polymer may be dissolved in an organic solvent for electric spinning, and is not swelled or swelled more slowly than the swelling polymer because of the organic solvent included in the organic electrolyte, and may use a resin having a melting point of 180° C. or higher.

As an example, the heat-resistant polymer or the non-swelling polymer may use aromatic polyester such as polyacrylonitrile (PAN), polyamide, polyimide, polyamideimide, polymeta-phenylene isophthalamide, polysulfone, polyetherketone, polyethylene terephthalate, polytrimethylene terephthalate, poly ethylene naphthalate, polytetrafluoroethylene, polyphosphazenes such as polydiphenoxyphosphazene, poly {bis [2-2-methoxyethoxy phosphazene]}, polyurethane copolymer including polyurethane and polyetherurethane, cellulose acetate, cellulose acetate butyrate, cellulose acetate propionate, and the like.

Meanwhile, the non-woven fabric, which constitutes the non-woven fabric layer 114a, may use one or more materials selected from cellulose, cellulose acetate, polyvinyl alcohol (PVA), polyvinyl alcohol, polysulfone, polyimide, polyetherimide, polyamide, polyethylene oxide (PEO), polyethylene (PE), polypropylene (PP), polyethylene terephthalate (PET), polyurethane (PU), polymethyl methacrylate (PMMA), and polyacrylonitrile.

Here, the non-woven fabric layer may further include an inorganic additive, and the inorganic additive may include one or more materials selected from SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, $Sn_2BPO_6$, $TiO_2$, $BaTiO_3$, $Li_2O$, LiF, LiOH, $Li_3N$, BaO, $Na_2O$, $Li_2CO_3$, $CaCO_3$, $LiAlO_2$, $SiO_2$, $Al_2O_3$, and PTFE.

Further, an average particle diameter of an inorganic particle, which is the inorganic additive, may be 10 to 50 nm, particularly, 10 to 30 nm, and more particularly, 10 to 20 nm.

Further, an average thickness of the separator may be 10 to 100 μm, particularly, 10 to 50 μm. The reason is that if an average thickness of the separator is smaller than 10 μm, it is impossible to ensure long-term durability of the separator when the battery is repeatedly folded and/or unfolded because the separator is too thin, and if an average thickness of the separator exceeds 100 μm, the average thickness is disadvantageous in implementing a thin flexible battery, and accordingly, the average thickness may be in the aforementioned range.

Further, an average thickness of the non-woven fabric layer may be 10 to 30 μm, particularly, 15 to 30 μm, and an average thickness of the nanofiber web layer may be 1 to 5 μm.

The exterior material 120 is formed as a plate-shaped member having a predetermined area, and accommodates therein the electrode assembly 110 and the electrolyte, thereby protecting the electrode assembly 110 from external force.

To this end, the exterior material 120 includes a first exterior material 121 and a second exterior material 122 which are provided in a pair, and is sealed by an adhesive along a rim thereof, thereby preventing the electrolyte and the electrode assembly 110 accommodated in the exterior material from being exposed and leaking to the outside.

That is, the first exterior material 121 and the second exterior material 122 include the first region S1 which defines the accommodating portion for accommodating the electrode assembly and the electrolyte, and the second region S2 which defines the sealing portion which is disposed to surround the first region S1 and prevents the electrolyte from leaking to the outside.

In the case of the exterior material 120, the first exterior material 121 and the second exterior material 122 may be formed as two members, and then both rims of the first exterior material 121 and the second exterior material 122, which constitute the sealing portion, may be sealed by an adhesive, or the first exterior material 121 and the second exterior material 122 may be formed in one piece, and folded in half in a width direction or longitudinal direction, and then the remaining portions, which face each other, may be sealed by an adhesive.

The exterior material 120 may be provided such that a metallic layer 121b or 122b is interposed between a first resin layer 121a or 122a and a second resin layer 121c or 122c. That is, the exterior material 120 is configured such that the first resin layer 121a or 122a, the metallic layer 121b or 122b, and the second resin layer 121c or 122c are sequentially laminated, the first resin layer 121a or 122a is disposed at an inner side and abuts the electrolyte, and the second resin layer 121c or 122c is exposed to the outside.

In this case, the first resin layer 121a or 122a may include a single layer structure of a material or a laminated structure of materials selected from acid modified polypropylene (PPa), casting polypropylene (CPP), linear low density polyethylene (LLDPE), low density polyethylene (LDPE), high density polyethylene (HDPE), polyethylene terephthalate, polypropylene, ethylene vinyl acetate (EVA), epoxy resin, and phenol resin, and particularly, the first resin layer 121a or 122a may be formed as a single layer of a material or laminated layers of two or more materials selected from acid modified polypropylene (PPa), casting polypropylene (CPP), linear low density polyethylene (LLDPE), low density polyethylene (LDPE), and high density polyethylene (HDPE).

Further, an average thickness of the first resin layer 121a or 122a may be 20 μm to 80 μm, and particularly, the average thickness may be 20 μm to 60 μm.

The reason is that an average thickness of the first resin layer 121a or 122a, which is smaller than 20 μm, decreases joining force between the first resin layers 121a and 122a which are directly attached to each other during a process in which the rims of the first exterior material 121 and the second exterior material 122 are sealed, or this average thickness may be disadvantageous in ensuring airtightness for preventing a leak of the electrolyte, and an average thickness, which is greater than 80 μm, is uneconomic and disadvantageous in implementing a thin product.

The metallic layer 121b or 122b is interposed between the first resin layer 121a or 122a and the second resin layer 121c or 122c, and serves to prevent moisture from permeating into the accommodating portion from the outside and to prevent the electrolyte from leaking from the accommodating portion to the outside.

To this end, the metallic layer 121b or 122b may be formed as a metallic layer having high density so that moisture and the electrolyte may not penetrate into the metallic layer. The metallic layer 121b or 122b may be formed of a thin metal plate such as a foil or a metal deposited film formed on the second resin layer 121c or 122c, which will be described below, by a typical publicly known method, for example, a method such as sputtering, and chemical vapor deposition, and particularly, the metallic layer may be formed as a thin metal plate, and with the metallic layer, it is possible to prevent the occurrence of a crack in the metallic layer when forming the patterns, thereby preventing the electrolyte from leaking to the outside or preventing permeation of moisture.

As an example, the metallic layer 121b or 122b may include one or more material selected from aluminum, copper, phosphorbronze (PB), aluminum bronze, cupronickel, beryllium-copper, chromium-copper, titanium-copper, iron-copper, corson alloy, and chromium-zirconium copper alloy.

In this case, a coefficient of linear expansion of the metallic layer 121b or 122b may be 1.0 to $1.7 \times 10^{-7}/°$ C., particularly, 1.2 to $1.5 \times 10^{-7}/°$ C. The reason is that if a coefficient of linear expansion is smaller than $1.0 \times 10^{-7}/°$ C., sufficient flexibility cannot be ensured, such that a crack may occur due to external force generated when the flexible battery is bent, and if a coefficient of linear expansion is greater than $1.7 \times 10^{-7}/°$ C., rigidity deteriorates, such that severe shape deformation may occur.

An average thickness of the metallic layer 121b or 122b may be 5 µm or greater, particularly, 5 µm to 100 µm, and more particularly, 30 µm to 50 µm.

The reason is that if an average thickness of the metallic layer is smaller than 5 µm, moisture may permeate into the accommodating portion, or the electrolyte in the accommodating portion may leak to the outside.

The second resin layer 121c or 122c is positioned on an exposed surface of the exterior material 120, and serves to enhance strength of the exterior material, and prevent the exterior material from being damaged such as scratched due to physical contact applied from the outside.

The second resin layer 121c or 122c may include one or more materials selected from nylon, polyethylene terephthalate (PET), cyclo olefin polymer (COP), polyimide (PI), and a fluorine-based compound, and particularly, the second resin layer 121c or 122c may include nylon or a fluorine-based compound.

Here, the fluorine-based compound may include one or more materials selected from polytetra fluoroethylene (PTFE), perfluorinated acid (PFA), fluorinated ethelene propylene copolymer (FEP), polyethylene tetrafluoro ethylene (ETFE), polyvinylidene fluoride (PVDF), ethylene chlorotrifluoroethylene (ECTFE), and polychlorotrifluoroethylene (PCTFE).

In this case, an average thickness of the second resin layer 121c or 122c may be 10 µm to 50 µm, and particularly, the average thickness may be 15 µm to 40 µm, and more particularly, 15 µm to 35 µm.

The reason is that an average thickness of the second resin layer 121c or 122c, which is smaller than 10 µm, may not ensure mechanical physical properties, and an average thickness greater than 50 µm is advantageous in ensuring mechanical physical properties, but uneconomic and disadvantageous in implementing a thin product.

Meanwhile, the flexible battery 100 or 100' according to the present invention may further include an adhesive layer between the metallic layer 121b or 122b and the first resin layer 121a or 122a.

The adhesive layer serves to increase adhesive force between the metallic layer 121b or 122b and the first resin layer 121c or 122c, and to prevent the electrolyte accommodated in the exterior material from reaching the metallic layer 121b or 122b of the exterior material, thereby preventing the metallic layer 121b or 122b from being corroded by the acidic electrolyte or preventing the first resin layer 121a or 122a and the metallic layer 121b or 122b from being separated from each other.

In addition, it is possible to provide reliability in respect to safety by preventing a leak of the electrolyte even in a case in which the flexible battery expands due to a problem such as abnormal overheating during use of the flexible battery 100 or 100'.

The adhesive layer may be made of a material similar to that of the first resin layer 121a or 122a. As an example, the adhesive layer may include one or more materials selected from silicone, polyphthalate, acid modified polypropylene (PPa), and acid modified polyethylene (Pea).

The adhesive layer serves to increase adhesive force between the metallic layer 121b or 122b and the second resin layer 121c or 122c, and may provide reliability in respect to safety, an internal short-circuit, and the like even though a problem such as abnormal overheating occurs during use of the flexible battery 100 or 100'.

In this case, an average thickness of the adhesive layer may be 5 µm to 30 µm, particularly, 10 µm to 20 µm. The reason is that if an average thickness of the adhesive layer is greater than 5 µm, it is impossible to ensure stable adhesive force, and an average thickness greater than 30 µm is disadvantageous in implementing a thin product.

Meanwhile, the flexible battery 100 or 100' according to the present invention may further include a dry lamination layer between the metallic layer 121b or 122b and the second resin layer 121c or 122c.

The dry lamination layer serves to attach the metallic layer 121b or 122b and the second resin layer 121c or 122c, and may be formed by drying a publicly known aqueous and/or oil-based organic solvent-based adhesive.

In this case, an average thickness of the dry lamination layer may be 1 µm to 7 µm, particularly, 2 µm to 5 µm, and more particularly, 2.5 µm to 3.5 µm.

The reason is that if an average thickness of the dry lamination layer is smaller than 1 µm, adhesive force is too low, such that the metallic layer 121b or 122b and the second resin layer 121c or 122c may be separated from each other, and if an average thickness is greater than 7 µm, a thickness of the dry lamination layer is unnecessarily increased, which may have an adverse effect on the formation of the patterns for contraction and extension.

Meanwhile, a liquid-phase electrolyte, which is typically used, may be used as the electrolyte encapsulated in the accommodating portion together with the electrode assembly 110.

As an example, as the electrolyte, an organic electrolyte including a nonaqueous organic solvent and a lithium salt solute may be used. Here, as the nonaqueous organic solvent, carbonate, ester, ether, or ketone may be used. Dimethyl carbonate (DMC), diethyl carbonate (DEC), dipropyl carbonate (DPC), methyl propyl carbonate (MPC), ethyl propylcarbonate (EPC), methyl ethyl carbonate (MEC), ethylene carbonate (EC), propylene carbonate (PC), butylene carbonate (BC), and the like may be used as the carbonate, butyrolactone (BL), decanolide, valerolactone, mevalonolactone, caprolactone, n-methyl acetate, n-ethyl acetate, n-propyl acetate, and the like may be used as the ester, dibutyl ether or the like may be used as the ether, and there is polymethyl vinyl ketone as the ketone, but the present invention is not limited to the type of the nonaqueous organic solvent.

In addition, the electrolyte used for the present invention may include lithium salt, the lithium salt acts as a lithium ion supply source in the battery and enables an operation of the basic lithium battery, and as an example, the lithium salt may include one or more materials or a mixture of the materials selected from a group consisting of $LiPF_6$, $LiBF_4$, $LiSbF_6$, LiAsF$_6$, LiClO$_4$, LiCF$_3$SO$_3$, LiN(CF$_3$SO$_2$)$_2$, LiN(C$_2$F$_5$SO$_2$)$_2$, LiAlO$_4$, LiAlCl$_4$, LiN(C$_x$F$_{2x}$+1SO$_2$)(C$_y$F$_{2x}$+1SO$_2$) (Here, x and y are rational numbers), and LiSO$_3$CF$_3$.

In this case, a liquid-phase electrolyte may be used as the electrolyte used in the flexible battery 100 or 100' according to the present invention, but particularly, a gel polymer electrolyte may be used. Therefore, since the flexible battery 100 or 100' according to the present invention uses the gel-phase polymer electrolyte as the electrolyte, it is possible to prevent a leak and lachrymal fluid which may occur when the flexible battery is bent in a case in which a liquid-phase electrolyte is used as the electrolyte of the flexible battery.

The gel polymer electrolyte may be formed by allowing an organic electrolyte, which includes a nonaqueous organic solvent, a lithium salt solute, a monomer for forming gel polymer, and a polymerization initiator, to be subjected to gelation heat-treatment.

The gel polymer electrolyte may be implemented by allowing only the organic electrolyte to be subjected to the heat treatment, but the gel polymer electrolyte may be implemented in a form in which the pores of the separator 114 are impregnated with the gel-phase gel polymer, by in-situ polymerizing a monomer through the heat treatment in a state in which the separator provided in the flexible battery is impregnated with the organic electrolyte. The in-situ polymerization reaction in the flexible battery proceeds through thermal polymerization, the polymerization is carried out for about 20 minutes to 12 hours, and the thermal polymerization may be carried out at 40 to 90° C.

In this case, as the monomer for forming the gel polymer, any monomer may be used as long as the polymer forms the gel polymer while the polymerization reaction is carried out by the polymerization initiator. For example, methyl methacrylate (MMA), polyethylene oxide (PEO), polypropylene oxide (PPO), polyacrylonitrile (PAN), polyvinylidene fluoride (PVDF), polymethacrylate (PMA), polymethyl methacrylate (PMMA) or a monomer with respect to the polymer, or polyacrylate having two or more functional groups such as polyethylene glycol dimethacrylate, and polyethylene glycol acrylate may be exemplified.

In addition, as an example of the polymerization initiator, there are organic peroxide such as benzoyl peroxide, acetyl peroxide, dilauryl peroxide, di-tertbutylperoxide, cumyl hydroperoxide, and hydrogen peroxide, or azo-compound such as hydroperoxide, 2,2-azobis(2-cyanobutane), and 2,2-azobis(methylbutyronitrile). The polymerization initiator forms a radical by being decomposed by heat, reacts with the monomer by free radical polymerization, thereby forming the gel polymer electrolyte, that is, the gel polymer.

The monomer for forming the gel polymer may be 1 to 10 wt. % with respect to the organic electrolyte. If the monomer content is less than 1, it is difficult to form the gel electrolyte, and if the monomer content exceeds 10 wt. %, there is a problem with lifetime degradation. In addition, the polymerization initiator may be included by 0.01 to 5 wt. % with respect to the monomer for forming the gel polymer.

Figure 12:
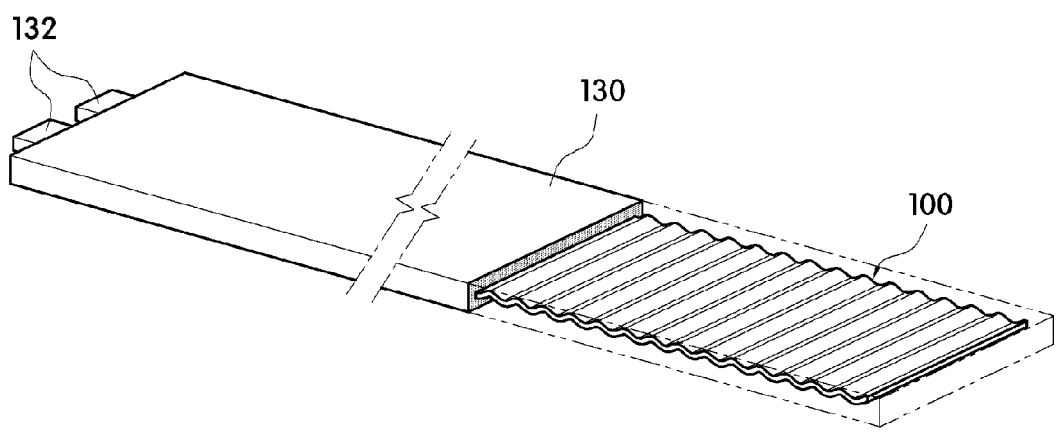
FIG. 12 is a schematic view illustrating a state in which the flexible battery according to the exemplary embodiment of the present invention is embedded in a housing so as to be implemented as an auxiliary battery.

Meanwhile, as illustrated in FIG. 12, the flexible battery 100 according to the exemplary embodiment of the present invention includes a housing 130 that covers a surface of the exterior material 120, and the housing 130 include at least one terminal unit 132 to be electrically connected with a target device to be charged, and as a result, the flexible battery 100 may be implemented in the form of an auxiliary battery. Here, the housing 130 may be made of a material such as plastic or metal having rigidity, but a flexible and soft material such as silicone or leather may be used.

Here, the auxiliary battery may be implemented as accessories such as a bracelet or an ankle bracelet, a watch strap, and the like, such that the auxiliary battery is used as a fashion product when it is not necessary to charge the target device to be charged, and when the target device to be charged needs to be charged, the auxiliary battery is electrically connected with the target device to be charged through the terminal unit 132, and as a result, it is possible to charge a main battery of the target device to be charged regardless of places.

Here, a pair of terminal units 131 is illustrated as being provided at an end portion of the housing 130, but the present invention is not limited thereto, or the terminal unit 131 may be provided at a lateral side of the housing 130, or may be provided at various positions such as an upper or lower surface of the housing. In addition, it is noted that the terminal unit 131 may be provided in a state in which a negative electrode terminal and a positive electrode terminal are separated from each other, or a positive electrode and a negative electrode are configured in one piece like an USB.

In addition, the flexible battery according to the present invention may be used as a main battery or an auxiliary battery of an electrical and/or electronic device that needs to have flexibility. It is noted that as an example, the flexible battery according to the present invention may be widely used for electronic devices such as a watch strap of a smart watch, and a flexible display.

Meanwhile, the flexible battery 100 according to the present invention may be manufactured by simultaneously pressing the electrode assembly 110 and the exterior material 120 in a state in which the electrode assembly 110 is encapsulated in the exterior material 120 so that the patterns 119 and 124 for contraction and extension may be formed on the electrode assembly 110 and the exterior material 120 so as to be coincident with each other.

As an example, the patterns 119 and 124 may be formed by allowing a plate-shaped flexible battery to pass between a pair of rollers of which the outer circumferential surfaces have predetermined patterns formed thereon. Here, trough portions and crest portions, which constitute the patterns 119 and 124, are alternately formed along the outer circumferential surfaces of the pair of rollers, respectively, and the crest portion formed on one roller meshes with the trough portion formed on the other roller when the pair of rollers is engaged with each other.

Therefore, when the plate-shaped flexible battery passes between the pair of rollers, the electrode assembly 110 and the exterior material 120 are simultaneously pressed by the pair of rollers, such that the crest portions and the trough portions are alternately and continuously formed in the longitudinal direction, and the patterns, which are coincident with each other, are formed on the electrode assembly 110 and the exterior material 120, respectively.

Here, the electrolyte, which is encapsulated in the exterior material 120 together with the electrode assembly 110, may be injected into the exterior material 120 after the patterns are formed by allowing the flexible battery to pass between the pair of rollers, or may be injected into the exterior material 120 before the flexible battery passes between the pair of rollers.

However, it is noted that the method of manufacturing the flexible battery according to the present invention is not limited thereto, and the flexible battery may be manufactured by separately forming the first pattern 124 and the second pattern 119 on the exterior material 120 and the electrode assembly 110, respectively, and then bonding the exterior material 120 and the electrode assembly 110 so that the first pattern 124 and the second pattern 119 are coincident with each other.

While the exemplary embodiment of the present invention has been described above, the spirit of the present invention is not limited to the exemplary embodiment disclosed in the present specification, and those skilled in the art, who understand the spirit of the present invention, may easily propose other exemplary embodiments by adding, changing, deleting, or modifying constituent elements without departing from the spirit of the present invention, and the exemplary embodiments are also included in the spirit and the scope of the present invention.

The invention claimed is:

1. A flexible battery comprising:
a plate-shaped electrode assembly; and
an exterior material in which the electrode assembly is encapsulated together with an electrolyte,
wherein the exterior material includes a first exterior material configured to cover a upper surface of the electrode assembly and a second exterior material configured to cover a lower surface of the electrode assembly,
wherein the electrode assembly and the exterior material are formed such that patterns for contraction and extension in a longitudinal direction have the same directionality when the flexible battery is bent,
and a first pattern formed on the exterior material and a second pattern formed on the electrode assembly, both patterns disposed such that crest portions and trough portions are formed in a longitudinal direction and formed such that crest portions are formed within each other,
wherein the first pattern formed on the first exterior material and a first pattern formed on the second exterior material are disposed such that crest portions are formed within each other.

2. The flexible battery of claim 1, wherein the first pattern and the second pattern are provided such that a plurality of crest portions and a plurality of trough portions are alternately formed in the longitudinal direction, and the crest portion and the trough portion have any one of an arc-shaped cross section, a polygonal cross section, or a combination thereof.

3. The flexible battery of claim 2, wherein each of the crest portion and the trough portion is continuously or discontinuously formed in a direction parallel to a width direction of the electrode assembly and the exterior material.

4. The flexible battery of claim 2, wherein the first pattern and the second pattern are entirely or partially formed on the electrode assembly and the exterior material.

5. The flexible battery of claim 2, wherein intervals between neighboring crest portions or intervals between neighboring trough portions are formed to have an equal interval or an unequal interval, or the equal interval and the unequal interval are combined.

6. The flexible battery of claim 1, wherein the first pattern and the second pattern are continuously or discontinuously formed in the longitudinal direction.

7. The flexible battery of claim 1, wherein the exterior material includes a first region for forming an accommodating portion that accommodates the electrode assembly and the electrolyte, and a second region which is disposed to surround the first region and forms a sealing portion, and the first pattern is formed only in the first region.

8. The flexible battery of claim 1, wherein the electrode assembly includes a positive electrode and a negative electrode which are configured as a part or the entirety of a current collector is coated with an active material, and a separator which is disposed between the positive electrode and the negative electrode, and the separator includes a porous non-woven fabric layer which has pores, and a nanofiber web layer which contains polyacrylonitrile nano fibers on one surface or both surfaces of the non-woven fabric layer.

9. The flexible battery of claim 8, wherein the active material includes PTFE so as to prevent a crack and prevent separation from the current collector.

10. The flexible battery of claim 1, wherein the exterior material is formed such that a first resin layer, a metallic layer, and a second resin layer are sequentially laminated, and the second resin layer is exposed to the outside.

11. The flexible battery of claim 10, wherein the first resin layer is configured as a single layer of a material or a laminated layer of two or more materials selected from acid modified polypropylene (PPa), casting polypropylene (CPP), linear low density polyethylene (LLDPE), low density polyethylene (LDPE), high density polyethylene (HDPE), polyethylene terephthalate, polypropylene, ethylenevinyl acetate (EVA), epoxy resin, and phenol resin.

12. The flexible battery of claim 10, wherein the metallic layer includes one or more material selected from aluminum, copper, phosphorbronze (PB), aluminum bronze, cupronickel, beryllium-copper, chromium-copper, titanium-copper, iron-copper, corson alloy, and chromium-zirconium copper alloy.

13. The flexible battery of claim 10, wherein the second resin layer includes one or more materials selected from nylon, polyethylene terephthalate (PET), cyclo olefin polymer (COP), polyimide (PI), and a fluorine-based compound.

14. The flexible battery of claim 13, wherein the fluorine-based compound includes one or more materials selected from polytetra fluoroethylene (PTFE), perfluorinated acid (PFA), fluorinated ethylene propylene copolymer (FEP), polyethylene tetrafluoro ethylene (ETFE), polyvinylidene fluoride (PVDF), ethylene chlorotrifluoroethylene (ECTFE), and polychlorotrifluoroethylene (PCTFE).

15. The flexible battery of claim 10, wherein an adhesive layer is disposed between the metallic layer and the first resin layer, and the adhesive layer includes one or more materials selected from silicone, poly phthalate, acid modified polypropylene (PPa), and acid modified polyethylene (PEa).

16. The flexible battery of claim 10, wherein a dry lamination layer is disposed between the metallic layer and the second resin layer.

17. The flexible battery of claim 16, wherein an average thickness of the dry lamination layer is 1 μm to 7 μm.

18. The flexible battery of claim 1, wherein the electrolyte includes a gel polymer electrolyte.

19. An auxiliary battery comprising:
the flexible battery according to claim 1; and
a housing which covers a surface of the exterior material, wherein the housing is provided with at least one terminal unit to be electrically connected with a target device to be charged.

20. A method of manufacturing a flexible battery in which a plate-shaped electrode assembly is encapsulated in an exterior material together with an electrolyte,
wherein the exterior material includes a first exterior material configured to cover a upper surface of the electrode assembly and a second exterior material configured to cover a lower surface of the electrode assembly, wherein the electrode assembly, the first exterior material, and the second exterior material include patterns for contraction and extension in a longitudinal direction when the flexible battery is bent, and the patterns are formed by simultaneously pressing both the electrode assembly and the exterior material in a state in which the electrode assembly is encapsulated in the exterior material so that the pattern formed on the first exterior material, the pattern formed on the second exterior material, and the pattern formed on the electrode assembly are disposed such that crest portions of the patterns are formed within each other and are simultaneously formed.

* * * * *